April 7, 1942.    P. E. KUHL    2,278,999
RECOVERY OF HYDROCARBONS FROM FUEL GASES
Filed March 17, 1939
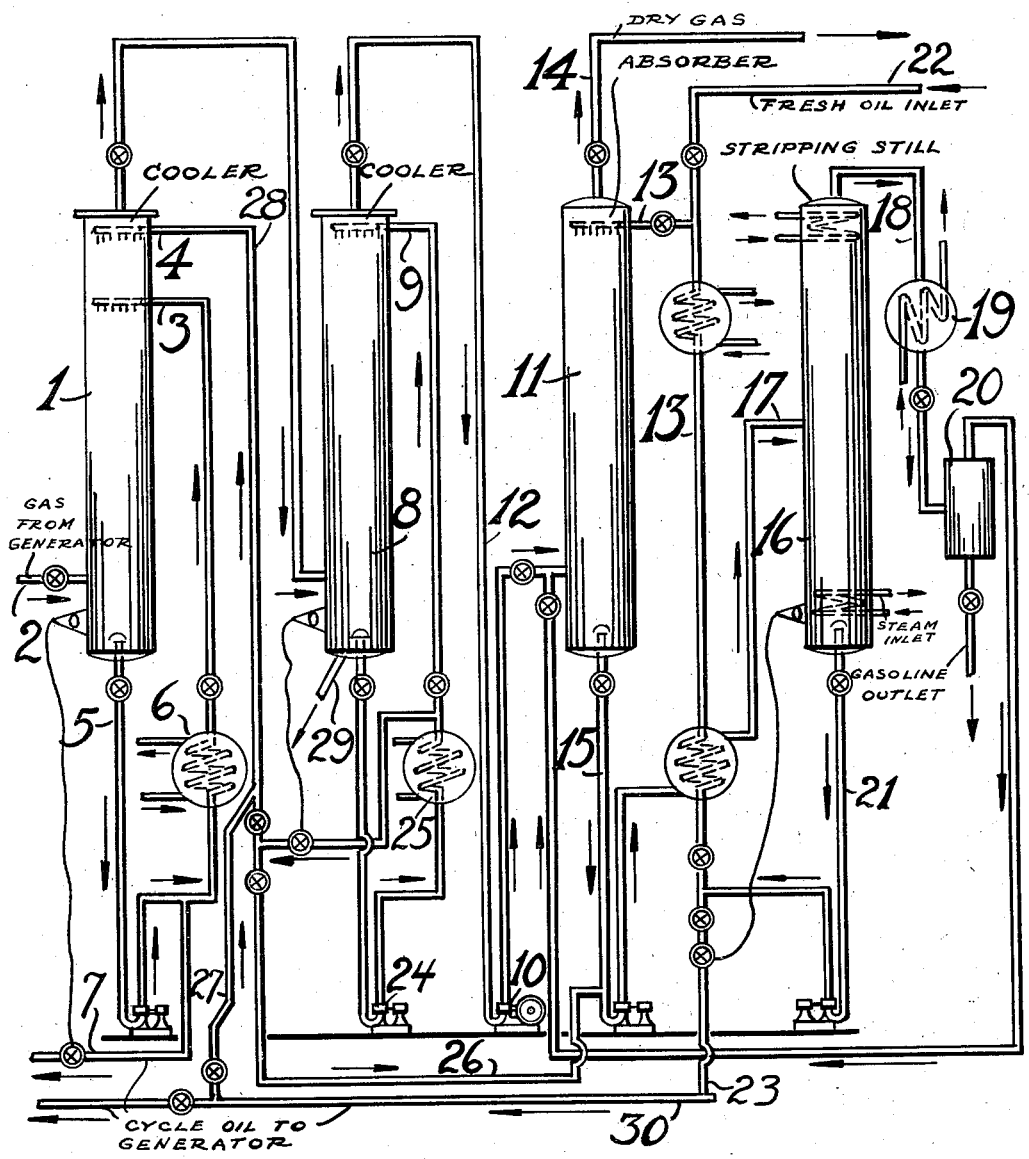
Paul E. Kuhl Inventor
By Ph. Young Attorney Patented Apr. 7, 1942

2,278,999

UNITED STATES PATENT OFFICE 2,278,999

RECOVERY OF HYDROCARBONS FROM FUEL GASES

Paul E. Kuhl, Madison, N. J., assignor to Standard Oil Development Company, a corporation of Delaware Application March 17, 1939, Serial No. 262,376

1 Claim. (Cl. 183—114.6)

The present invention relates to the recovery of products produced in the manufacture of various industrial gases. The invention is especially concerned with improved apparatus and methods for the recovery of gasoline produced in the manufacture of carbureted water or producer gas. In accordance with the present process, products produced in the carburetion of industrial gases are efficiently and economically recovered by a particular sequence of stages comprising a two-stage direct cooling process.

It is well known in the art to produce industrial gases by various methods and to enrich these gases by carbureting with petroleum oils. These processes utilize a generator in which the carbonaceous product, usually coal, is raised to an incandescent temperature. Steam is then passed through the incandescent bed, resulting in the formation of hydrogen and carbon monoxide. Petroleum oil is injected into the system under conditions which result in the vaporization and cracking of the oil. The oil may be injected in the generator or may be admitted in a carburetor which is usually a fire brick lined vessel filled with checkered brick and provided with an oil spray. The gases removed from the generator and carburetor contain water gas, a certain amount of air gas, oil gas, gasoline, cycle oil, tar and coke dust. The removal of these products from the water gas has involved considerable difficulties and expense. My invention is particularly directed to the economical purification of industrial gases secured by these operations and the efficient recovery of the by-products.

The process of my invention may be readily understood by reference to the attached drawing illustrating one modification of the same. Gases from a water gas generating system are led into the bottom of an initial cooler 1 by means of feed line 2. These gases flow upwardly through cooler 1 and contact downflowing recycle oil introduced into cooler 1 by means of feed line 3 and also contact fresh oil which is introduced by means of line 4. Oil is removed from the bottom of cooler 1 by means of line 5 and cooled indirectly by water in exchanger 6 and then returned to the top of gas cooler 1 by means of line 3. Accumulation of oil in the system is avoided by returning to the generator by means of line 7 the amount of oil condensed in cooler 1, as well as the amount of oil introduced by means of line 4. The gases are removed overhead from cooler 1 and introduced into the bottom of a second cooler 8. The gases flow upwardly in cooler 8 and contact downflowing cold cycle oil which is supplied by means of line 9 in sufficient quantity to cooler 8 to reduce the temperature of the gases to the point desired for subsequent absorption. The gases are removed overhead from cooler 8 and may be compressed in compressor 10. The compressed gases then pass into the bottom of absorber 11 by means of line 12. In absorber 11 the gases flow upwardly and countercurrently contact lean oil which is introduced into absorber 11 by means of line 13. The stripped dry gas is removed overhead from absorber 11 by means of line 14, while the rich oil is removed by means of line 15 and introduced into stripping still 16 by means of line 17. The absorbed products are removed overhead from stripping still 16 by means of line 18, condensed in condenser 19 and led into distillate drum 20. The stripped lean oil is removed from stripping still 16 by means of line 21 and introduced into the top of absorber 11 by means of line 13. Fresh oil for the carbureting system may be introduced into absorber 11 by means of line 22. The fresh feed oil containing the absorbed products is then led into stripping still 16 by means of line 17 and the absorbed products removed as described above. The stripped fresh feed oil is removed from stripping still 16 by means of line 21 and then introduced into the carbureting system by means of line 23.

Under certain operating conditions it may be desirable to introduce at least a portion of the lean oil into cooler 1 by means of lines 27 and 4. Oil from the bottom of the second cooler is withdrawn by means of line 24, cooled indirectly with water in cooler 25 and then returned to the top of cooler 8. Oil equivalent to the amount of oil condensed in cooler 8 is withdrawn and introduced into cooler 1 as fresh feed oil to cooler 1 by means of line 4. If additional fresh feed oil is required in cooler 1 it may be introduced by means of line 27 or by means of line 28. If desirable, oil or water may be introduced or withdrawn from cooler 8 by means of line 29. However, any accumulation of oil in cooler 8 due to condensation of cycle oil and gasoline fractions not introduced into cooler 1 by means of line 4 is preferably withdrawn by means of line 26 and combined with the rich oil from the absorber to the stripping still by means of line 26. It may be desirable under certain conditions to introduce a portion of the feed oil into the carburetor by means of line 22 through absorber 11 and stripping still 16 and introduce the remaining oil by means of line 30.

The process of the present invention may vary widely and the conditions adjusted to secure optimum results with respect to the particular cycle oil being used and the amount and type of impurities from the carburetor system. It is essential that a two-stage direct cooling system be employed and that the coke deposit and the tarry matter be removed in the initial cooler. In order to secure this the gases are cooled in an initial stage from about 800° F. or higher to a temperature in the range from 400° to 450° F. In order to secure optimum results it is desirable that two oil sprays be included in cooler 1, the lower of these sprays being oil picked up from the bottom of cooler 1 and circulated through an indirect cooling device to a point higher in the tower. This spray will knock back most of the tar and coke dust. The upper oil spray should be clean oil, preferably from the bottom of the second cooler, which will serve to remove substantially all of the remaining coke, dust and tar so that a clean gas will be introduced into the secondary cooler.

The pressures employed in the coolers are preferably atmospheric, although other pressures may be employed. The quantity of oil employed in scrubbing the gases is of a sufficient quantity so that exit gases leaving the initial cooler will have a temperature of approximately 375° to 425° F. In general, it is preferred to utilize about 75% of recycle oil withdrawn from the bottom of the primary cooler and about 25% of relatively clean oil withdrawn from the bottom of the secondary cooler. Under certain conditions, however, it may be desirable to use approximately 50% recycle oil and 50% relatively clean oil. The exit gases from the primary cooler are then further cooled to a temperature in the range from about 75° to 125° F. in a secondary direct oil cooler. The quantity of oil used in the secondary cooler will likewise be sufficient to reduce the temperature of the gases to this temperature. The exit gases from the secondary cooler are preferably compressed to about 50 to 150 lbs. and introduced into the absorber. The temperature and pressure conditions maintained in the absorber will depend upon the particular absorber oil being used, as well as upon the composition of the gases. In general, it is preferred to absorb the gases at a temperature in the range from 50° to 120° F. at a pressure of from 50 to 150 lbs. per square inch.

The gas from the generator contains a considerable amount of coke, dust and tarry matter which is removed in cooler 1 generally by the lower spray. The upper spray comprising clean oil from the secondary cooler removes the remainder of the coke, dust and tar so that a clean gas is introduced into the secondary cooler. Heavy tar and coke are removed from the primary tower from below the level at which the circulation oil is withdrawn.

The present invention secures efficient heat transfer and purification of the generator gases. In the primary cooler a large part of the oil from the bottom of the secondary cooler will be revaporized and returned to the secondary cooler, thus utilizing the latent heat of the cooling medium. The invention is particularly applicable in the treatment of lean gases.

In order to further illustrate the invention, the following example is given which should not be construed as limiting the same in any manner whatsoever.

*Example*

A highly super heated steam was passed into a coke bed in a producer gas generator. A petroleum oil was introduced into the coke bed at a point above the introduction of the steam. The gases secured from the generator, based upon the fresh oil feed to the generator, were as follows:

| | | |
|---|---|---|
| Gasoline, volume | per cent | 30–35 |
| Total uncracked gas oil, weight | do | 6–20 |
| Oil to water gas | do | 2–6 |
| Oil gas | do | 50–60 |
| Total gas | cubic feet per hour | about 400 |

The gasoline had an inspection as follows:

| | | |
|---|---|---|
| Gravity | per cent | 44–88 |
| Initial boiling point | | 80–90 |
| 10% off at | degrees Fahrenheit | 120–135 |
| 20% off at | do | 160–210 |
| 30% off at | do | 190–240 |
| 40% off at | do | 240–310 |
| 50% off at | do | 300–340 |
| 60% off at | do | 315–360 |
| 70% off at | do | 340–375 |
| 80% off at | do | 360–385 |
| 90% off at | do | 380–400 |
| Final boiling point | do | 400–420 |

The inspection of the finished gas was as follows:

| | | |
|---|---|---|
| Heating value | Btu.'s/cu. ft | 470–560 |
| Carbon dioxide | per cent | 5–7 |
| Illuminants | do | 8–12 |
| Oxygen | do | 2–3 |
| Hydrogen | do | 50–60 |
| Carbon monoxide | do | 5–15 |
| Methane | do | 9–14 |
| Nitrogen | do | 8–12 |
| Specific gravity | | .5–.7 |

When this gas was treated in accordance with the process of the present invention, the coke, dust and tarry matter were removed in the initial cooler and the heavy coke and tar removed from the bottom of said cooler. Clean oil was removed from the bottom of the secondary cooler and the gasoline removed from the overhead gases of the secondary cooler by absorption in the absorber. Dry gas was removed from the overhead from the absorber.

The present invention is not to be limited by any theory or mode of operation, but only by the following claims in which it is desired to claim all novelty in so far as the prior art permits.

I claim:

Process for the purification of carbureted water and producer gas and for the recovery therefrom of hydrocarbon constituents boiling in the gasoline boiling range, comprising passing said carbureted gas through an initial countercurrent direct oil cooler containing two oil sprays, one disposed above the other, under conditions to remove therefrom entrained solid particles and hydrocarbon fractions boiling above the gasoline boiling range, passing the cooled gases through a secondary countercurrent direct oil cooler under conditions to condense a substantial amount of the hydrocarbon fractions boiling in the gasoline boiling range, removing cooled gases from said secondary cooler and subjecting the same in an absorption stage to countercurrent contact with an absorption oil under conditions to produce a gas substantially free of hydrocarbon constituents boiling in the gasoline boiling range, removing said absorption oil and recovering hydrocarbon constituents therefrom in a distillation stage, said lower oil spray of said initial cooler comprising recycle oil withdrawn from the lower portion of said initial cooler and said upper oil spray of said initial cooler comprising clean oil containing gasoline constituents withdrawn from the bottom portion of said secondary cooler so that cooling of said initial cooler is obtained by evaporation of at least part of the gasoline constituents.

PAUL E. KUHL.